J. T. TAYLOR.
MEANS FOR OPERATING DOORS OF HATCHES.
APPLICATION FILED NOV. 19, 1909.
955,561.
Patented Apr. 19, 1910.
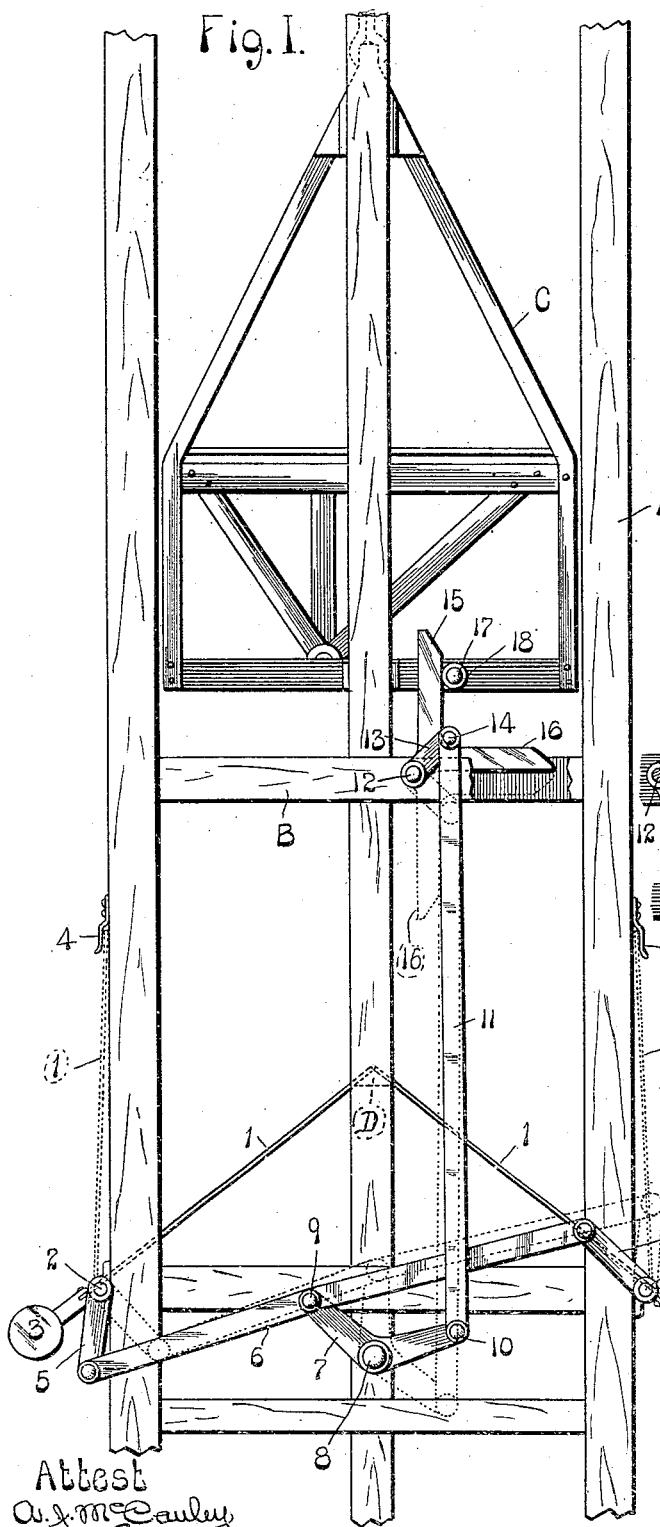
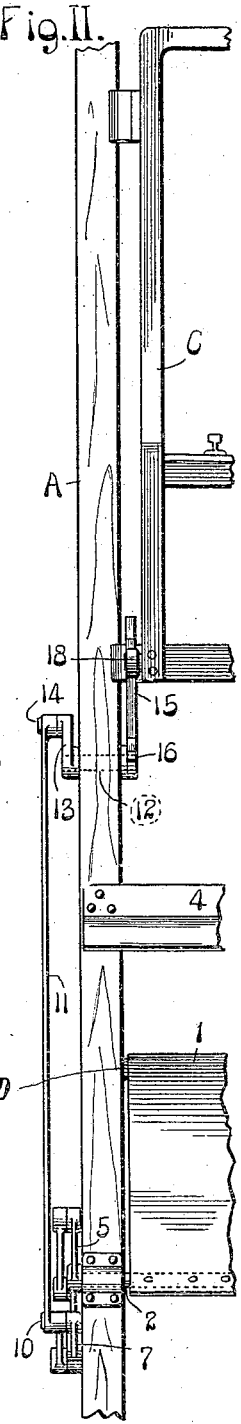
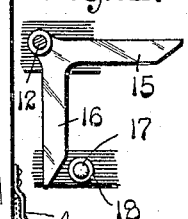
Attest
A. J. McCauley
E. B. —
Inventor:
J. T. Taylor
by E. S. Knight Atty.

UNITED STATES PATENT OFFICE.

JOHN T. TAYLOR, OF BELLEVILLE, ILLINOIS.

MEANS FOR OPERATING DOORS OF HATCHES.

955,561.  Specification of Letters Patent. Patented Apr. 19, 1910.

Application filed November 19, 1909. Serial No. 528,895.

*To all whom it may concern:*

Be it known that I, JOHN T. TAYLOR, a citizen of the United States of America, residing at Belleville, in the county of St. Clair and State of Illinois, have invented certain new and useful Improvements in Means for Operating Doors of Hatches, of which the following is a full, clear, and exact description, reference being had to the accompanying drawings, forming part of this specification.

My invention relates to means for automatically opening and closing doors for controlling hatches or hatchways, and is more particularly intended for use in the hatches of mines to prevent the descent through the hatch or mine shaft of material that might fall from a car operable in the hatch and descend therethrough to the injury of workmen engaged in their labors at the bottom of the shaft.

Figure I is a front elevation of a hatch, a cage operable therein, the hatch doors, and my means for operating said doors which is controlled by said cage. Fig. II is a side elevation of the parts shown in Fig. I. Fig. III is a detail elevation of the double-armed lever that is engaged by the cage and the cage carried member that engages said lever, the parts being illustrated in the positions they occupy after the lever engaging member of the cage has moved downwardly from the position in which it is seen in Fig. I and actuated the double-armed lever.

In the accompanying drawings:—A designates the upright frame members of a hatch and B a horizontal frame member of said hatch.

C is a cage that has a converging top and is adapted to be raised and lowered in the hatch.

1 designates a pair of hatch doors that are connected to the hatch framework by pivot shafts 2, and each of which is adapted to be operated in part by a counter weight 3. The doors 1, when closed, occupy the upwardly inclined positions seen in full lines Figs. I and II with their meeting edges seated on the inverted V-shaped projections D, and, when open, occupy the vertical position seen in dotted lines in Fig. I, their opening movement being restricted by stops 4 in the form of depending strips.

The pivot shaft 2 of each door 1 has fixed to it an upwardly extending crank arm 5 located on one side of the hatch and another downwardly extending crank arm 5 on the other side of the hatch, and the two crank arms are united by a connecting rod 6 inclined from the upper crank arm to the lower crank arm and which, when it is moved endwise, or transversely, of the hatch, acts to impart movement to the crank arms for the purpose of imparting partial rotation to the pivot shafts 2 to move the hatch doors into vertical open or upwardly inclined closed position, according to the direction in which the connecting rod is shifted.

7 is a bell crank lever pivoted beneath the connecting rod 6 intermediate of its ends at 8 to a member of the hatch framework, and one upwardly extending arm of which is pivoted at 9 to the connecting rod 6. The other laterally extending arm of said bell crank lever receives the pivotal connection at 10 of a vertical operating rod 11, the upper end of which is located in proximity to the horizontal member B of the hatch framework.

12 designates a rock shaft supported by the framework member B, and which has fixed to it a lever arm 13 to which the operating rod 11 is pivotally connected at 14. The parts for operating the hatch doors that have been thus far described, (with the exception of the rock shaft 12), are preferably located at the outside of the hatch framework so that they are out of the path of travel of the cage C.

The rock shaft 12 has fixed to it a double-armed right angle lever which is located interiorly of the hatch and comprises lever arms 15 and 16. These lever arms are adapted to be engaged by a stud 17, preferably provided with a roller 18, and which is carried by the cage C.

In the practical use of my hatch door operating means, the operation is as follows: Assuming the hatch doors to be in closed upwardly inclined position, and the cage C to be in elevated position, as illustrated in full lines in the drawings, the door operating means will be actuated upon the descent of the cage in the following manner: As the cage descends from the position shown in the drawings, the stud 17 acts, by engagement with the lower arm 16, of the double-armed right angle lever carried by the rock shaft 12, to move said double-armed right angle lever until it occupies the position seen in dotted lines, Fig. I, and in full lines Fig. III, in which movement of the lever the rock shaft 12 is partially rotated and the lever arm 13 is moved downwardly to the position indicated in dotted lines, Fig. I. The lever arm 13 in its movement acts to impart downward movement to the vertical operating rod 11, and this operating rod, through the medium of the bell crank lever 7, acts to impart movement transversely of the hatch to the connecting rod 6 so that it is shifted from the position in which it is seen in full lines, Fig. I. to the position in which it is seen in dotted lines. The connecting rod in its movement serves to actuate the crank arms 5, with the result of partially rotating the pivot rods 2, so that the doors 1 fixed to said pivot rods are elevated and moved outwardly to the vertical position indicated in dotted lines, Fig. I, to furnish a clear passageway in the hatch through which the cage C descends in its continued downward movement, after the actuation of the hatch doors has transpired. The hatch doors are held in open positions under the influence of the counter weights 3, while the cage is beneath the location of the hatch doors and until the cage has been again elevated and the stud 17 carried thereby is returned to the double-armed lever for engagement therewith. The stud, in the upward movement of the cage, strikes the upper arm 15 of the double-armed right angle lever, which is at this time in a horizontal position, and by so doing during the upward travel of the cage, acts to return the double armed right angle lever to its original position, whereby the door operating members are returned to the positions seen in full lines in the drawings, and the doors are closed to remain in closed positions until such time as the cage has been unloaded and is to be again loaded through the hatch.

I claim:—

1. The combination with a hatch, a pair of pivotally supported doors occupying a normally upwardly inclined position, and a cage, of means for operating said doors comprising a connecting rod extending across the hatch and having pivotal connection with the doors, a pivotally mounted lever pivoted to said connecting rod, an operating rod pivoted to said lever, a rock shaft, a lever arm fixed to said rock shaft and to which said operating rod is connected, and a double-armed right-angle lever fixed to said rock shaft and adapted to be actuated by said cage to impart movement to said operating and connecting rods and move said doors into either vertical open or upwardly inclined closed position.

2. The combination, with a hatch, a pair of pivotally supported hatch doors, occupying a normally upwardly inclined position and a cage; of an upwardly extending crank arm fixed to the pivot of one door, a downwardly extending crank arm fixed to the pivot of the other door, a connecting rod extending across the hatch and pivoted to the crank arms, a bell crank lever having an upwardly extending arm pivoted to the connecting rod, and a laterally extending arm, a rock shaft having a double-armed right-angle lever, and an arm fixed thereto, a vertical operating rod pivoted to the laterally extending arm and to the arm of the rock shaft, and means on the cage adapted to engage the arms of the double-armed right-angle lever.

JOHN T. TAYLOR.

In the presence of—
E. B. LINN,
A. J. McCAULEY.